(12) United States Patent
Kendall

(10) Patent No.: US 10,674,714 B2
(45) Date of Patent: Jun. 9, 2020

(54) WILD BIRD TREATMENT SYSTEM AND METHODS

(71) Applicant: Ronald J. Kendall, Ransom Canyon, TX (US)

(72) Inventor: Ronald J. Kendall, Ransom Canyon, TX (US)

(*) Notice: Subject to any disclaimer, the term of this patent is extended or adjusted under 35 U.S.C. 154(b) by 484 days.

(21) Appl. No.: 14/543,656

(22) Filed: Nov. 17, 2014

(65) Prior Publication Data
US 2015/0264893 A1 Sep. 24, 2015

Related U.S. Application Data

(60) Provisional application No. 61/969,383, filed on Mar. 24, 2014.

(51) Int. Cl.
*A01K 39/00* (2006.01)
*A01K 45/00* (2006.01)
*A01K 39/01* (2006.01)

(52) U.S. Cl.
CPC .......... *A01K 39/00* (2013.01); *A01K 39/0113* (2013.01); *A01K 45/00* (2013.01); *Y10T 29/49826* (2015.01)

(58) Field of Classification Search
CPC ........ A01K 31/00; A01K 31/10; A01K 39/01; A01K 39/02–31/24; A01K 45/00; A01M 23/00; A01M 23/16
(Continued)

(56) References Cited

U.S. PATENT DOCUMENTS 1,127,712 A * 2/1915 Wrenn ................... A01K 31/22
119/437
1,347,407 A * 7/1920 Rohlff ................... A01M 23/20
43/69
(Continued)

FOREIGN PATENT DOCUMENTS

GB 597701 A * 2/1948 ............. A01K 31/22

OTHER PUBLICATIONS

Boex, Bonnie, "Deluxe Repeating Sparrow Trap," sialis.org, 2005. http://www.sialis.org/hosp.htm Discloses a method for managing house sparrow populations including the use of a trap which uses a decoy cage to attract other birds.
(Continued)

*Primary Examiner* — Ebony E Evans
(74) *Attorney, Agent, or Firm* — Matheson Keys & Kordzik PLLC; Jerry M. Keys; Susan M. Maze

(57) ABSTRACT

A system for treating wild birds includes an enclosure formed of a mesh material large enough to accommodate a plurality of wild coveying birds targeted for treatment. A call bird box is positioned within the enclosure. A call bird of the same species as the targeted birds is housed in the call box and makes calls for attracting the targeted birds. At least one ground level entrance is provided, sized and located to permit the entry of targeted birds into the enclosure while excluding non-targeted animals. A feeder containing medicated feed is provided within the enclosure for feeding the targeted birds entering the enclosure in order to treat the targeted wild coveying birds for parasites or disease. A cover is provided for protecting the medicated feed in the feeder from the environment. Methods for installing such a treatment system and treating wild birds using a treatment system are disclosed.

35 Claims, 10 Drawing Sheets

(58) Field of Classification Search
USPC .............................................. 119/464; 43/60
See application file for complete search history.

(56) References Cited

U.S. PATENT DOCUMENTS

| | | | | |
|---|---|---|---|---|
| 1,367,416 | A * | 2/1921 | Meszaros | A01K 31/22 |
| | | | | 119/487 |
| 1,404,251 | A * | 1/1922 | Westenberger | A01K 39/012 |
| | | | | 119/52.4 |
| 1,467,329 | A * | 9/1923 | Kesterson | A01K 39/012 |
| | | | | 119/53 |
| 1,561,299 | A * | 11/1925 | Banks | A01K 39/012 |
| | | | | 119/52.1 |
| 1,758,415 | A * | 5/1930 | Tullis | A01K 31/06 |
| | | | | 119/463 |
| 2,116,850 | A * | 5/1938 | Rotz | A01K 37/00 |
| | | | | 119/714 |
| 2,155,544 | A | 4/1939 | Fred | |
| 2,346,001 | A * | 4/1944 | Bate | A01K 1/03 |
| | | | | 119/472 |
| D179,108 | S | 11/1956 | Adolph | |
| 2,898,884 | A * | 8/1959 | Messersmith | A61D 3/00 |
| | | | | 119/417 |
| 3,119,372 | A * | 1/1964 | Gantz | A01K 31/06 |
| | | | | 119/465 |
| 3,161,564 | A * | 12/1964 | Morehouse | A01N 37/48 |
| | | | | 514/619 |
| 3,254,627 | A | 6/1966 | Cross | |
| 3,439,651 | A * | 4/1969 | Granath | A01K 31/22 |
| | | | | 119/437 |
| 3,747,567 | A | 7/1973 | De | |
| 4,030,229 | A | 6/1977 | Sale | |
| 4,104,986 | A * | 8/1978 | Dunigan | A01K 31/06 |
| | | | | 119/459 |
| 4,563,835 | A | 1/1986 | Job | |
| 4,846,110 | A | 7/1989 | Reynolds | |
| 4,966,097 | A | 10/1990 | Rosenberger | |
| 5,016,573 | A | 5/1991 | Power | |
| 5,134,969 | A | 8/1992 | Mason | |
| 5,305,708 | A | 4/1994 | Keisler | |
| 5,551,372 | A * | 9/1996 | Nicholls | A01K 1/03 |
| | | | | 119/452 |
| D376,874 | S | 12/1996 | Reyes | |
| 5,755,176 | A | 5/1998 | Edwards | |
| D396,331 | S | 7/1998 | Niemetz | |
| 5,924,380 | A | 7/1999 | Rayborn | |
| 6,106,870 | A | 8/2000 | Rohrberg | |
| 6,321,686 | B2 * | 11/2001 | Geis | A01K 39/0113 |
| | | | | 119/429 |
| 6,571,739 | B2 | 6/2003 | Granda | |
| 6,609,327 | B2 * | 8/2003 | Stoico | A01M 23/18 |
| | | | | 43/61 |
| 6,919,364 | B2 * | 7/2005 | Howarth | A01N 43/50 |
| | | | | 119/231 |
| 7,059,274 | B2 | 6/2006 | Cheng | |
| 7,273,021 | B1 | 9/2007 | Russell | |
| 7,887,850 | B2 | 2/2011 | Warr | |
| 8,191,508 | B2 | 6/2012 | Greenwood | |
| 8,453,607 | B2 | 6/2013 | Carter | |
| 8,550,034 | B2 | 10/2013 | Potter | |
| 8,733,291 | B2 | 5/2014 | Dunigan | |
| 2004/0099223 | A1 * | 5/2004 | Ruff | A01K 39/014 |
| | | | | 119/433 |
| 2007/0199516 | A1 * | 8/2007 | Koch | A01K 31/18 |
| | | | | 119/300 |
| 2007/0277745 | A1 | 12/2007 | Clemmons | |
| 2008/0202443 | A1 * | 8/2008 | Potter | A01K 31/22 |
| | | | | 119/437 |
| 2008/0277638 | A1 * | 11/2008 | Benner | A01K 3/00 |
| | | | | 256/11 |
| 2011/0290187 | A1 | 12/2011 | Mindell | |
| 2014/0234474 | A1 | 8/2014 | Brunner | |

OTHER PUBLICATIONS

"Folding Feeder Trap," wheatear.biz, Updated Feb. 19, 2011. http://www.wheatear.biz/Wheatear/Wire_Traps.htm Discloses a mesh feeder trap featuring an entrance funnel and a spring loaded extraction door.

"Assorted Specialty Traps, Transfer Cages, and Restraint Cages: Small Bird Trap," discount-pet-superstore.com, 53835. http://www.discount-pet-superstore.com/live_animal_traps/ Discloses a trap featuring two funnel entry doors, two hinge unloading doors, and a third funnel door leading to the main holding compartment.

Dunham, Nlcholas, et al., "Evidence of an Oxyspirura petrowi epizootic in northern bobwhites (*Colinus virginianus*), Texas, USA," Journal of Wildlife Diseases, Jul. 2014, vol. 50, No. 3, pp. 552-558.

Dunham, Nlcholas, et al., "Live Eyeworm (*Oxyspirura petrowi*) extraction, In Vitro Culture, and Transfer for Experimental Studies," Journal of Parasitology, Jul. 24, 2014.

Greiner, Ellis C., Parasite Diagnosis by Fecal Examination, Journal of the Association of Avian Veterinarians, vol. 3, No. 2 (Summer, 1989), pp. 69-72.

* cited by examiner

WILD BIRD TREATMENT SYSTEM AND METHODS

CROSS-REFERENCES TO RELATED APPLICATION

This application claims priority pursuant to 35 U.S.C. 119 to U.S. provisional application Ser. No. 61/969,383 entitled WILD BIRD TREATMENT SYSTEM filed on Mar. 24, 2014.

FIELD OF INVENTION

This application concerns systems and methods for providing treatment to wild birds with diseases, and in particular providing treatment to birds with parasitic diseases.

BACKGROUND

Historically, *Colinus virginianus* ("bobwhite quail"), a wild coveying bird, have thrived throughout the Rolling Plains ecoregion of West Texas where they are a valuable economic species. Since 2010, bobwhite quail have experienced a historic decline in the Rolling Plains ecoregion. In the past, such declines in the bird population have been attributed to multiple causes, including drought, but the actual cause was not known. Results from recent research suggest that the historic decline may be the result of parasites in the bobwhite quail population.

A system and methods are herein disclosed for treating wild populations of a targeted bird species in their natural habitat for parasites and disease. In particular, the system and methods herein disclosed are for treating wild populations of wild coveying birds for their protection and population enhancement.

As used herein the term "covey" refers to a social group of birds of the same species.

As used herein the term "coveying" refers to the collective bird behavior associated with a social group of birds of the same species.

As used herein the term "wild bird" refers to any bird of a species that is living in nature without significant human control or care.

SUMMARY

Briefly, novel systems and methods for treating wild birds are provided.

The system includes an enclosure formed of a mesh material large enough to accommodate a plurality of wild coveying birds targeted for treatment. A call bird box is positioned within the enclosure for housing a call bird of the same species as the targeted wild coveying birds. The call bird makes calls for attracting the plurality of targeted wild coveying birds. At least one ground level entrance into the enclosure is provided, sized and located to permit the entry of targeted wild coveying birds into the enclosure while excluding non-targeted animals. The system includes a feeder within the enclosure for containing medicated feed for feeding the targeted wild conveying birds entering the enclosure in order to treat the targeted wild coveying birds for parasites or disease. A cover for protecting the medicated feed in the feeder from the environment is provided.

In another aspect, a method for installing a system for treating wild coveying birds targeted for treatment includes installing an enclosure having entrances for the wild coveying birds targeted for treatment on the native ground at a site in the habitat area of the targeted wild birds. The method further includes mounting a call bird box in the enclosure and introducing a call bird of the same species as the targeted wild birds and its feed and water into the call bird box. A feeder is installed within the enclosure, and the method includes charging the feeder with feed suitable for the targeted wild birds which enter the enclosure.

In a further aspect, a method for treating wild birds includes collecting at least one sample from at least one targeted wild bird from a targeted area of a natural habitat having a plurality of targeted wild birds. The method further includes testing the at least one collected sample to determine if the targeted birds are infected with parasites or another disease. The number of and location of treatment systems to be installed at sites in the targeted area that are needed to treat the plurality of targeted wild birds in the targeted area is determined. The method includes installing a plurality of treatment systems at a plurality of sites based upon the determining. Each of the treatment systems comprise an enclosure with at least one entrance for targeted wild birds to enter the enclosure, a call bird box positioned within the enclosure for housing a call bird of the same species as the targeted wild birds that makes calls for attracting the plurality of targeted wild birds to enter the enclosure through the at least one entrance, and a feeder located within the enclosure for storing feed suitable for the targeted birds, and charging the feeder with medicated feed to treat the targeted wild birds entering the enclosure for parasites or disease.

BRIEF DESCRIPTION OF THE DRAWINGS

For a more complete understanding of one or more embodiments of the present invention and the advantages thereof, reference is now made to the following descriptions taken in conjunction with the accompanying drawings, in which.

DETAILED DESCRIPTION

The methods and system disclosed herein provide a means of strategic delivery of treatments for disease or parasites to any targeted wild, coveying bird species in their natural habitat. Examples of wild, coveying bird species for which the methods and systems may be used include bobwhite quail, scaled quail, California quail, Gambel's quail, and certain species of pheasants. In a particular embodiment, a system and methods for effectively treating wild, coveying bird species for parasitic worms using treated feed is herein disclosed.

Bobwhite quail of the Rolling Plains ecoregion of West Texas are infected with parasitic worms, including the eyeworm (*Oxyspirura petrowi*), as well as other parasitic nematodes (such as cecal worms). Other types of wild, coveying birds may also be infected with the same or other parasitic nematodes. Recent scientific evidence reveals that, as strong infections occur, impacts to survival and reproduction are probable outcomes. A medicated feed can reduce or eliminate parasitic nematode infections. The methods and system disclosed herein deliver medicated feed directly to the targeted wild, coveying bird populations, such as the bobwhite quail, while excluding other wildlife and domesticated animals from the medicated feed.

The uncontrolled distribution of medicated feed for treating a targeted bird species in a habitat may result in such feed also being ingested by non-targeted wild and domesticated animals. This may be harmful or destructive to the non-targeted species. In addition, the treatment of diseases or parasites in wildlife with medicated feed may be subject to regulation by state and federal agencies to limit the potential harm to non-targeted species. As a result, the unrestricted distribution of medicated feed into a habitat may be legally prohibited pending the conduct of trial studies of the impact of the medicated feed on the habitat.

Figure 1:
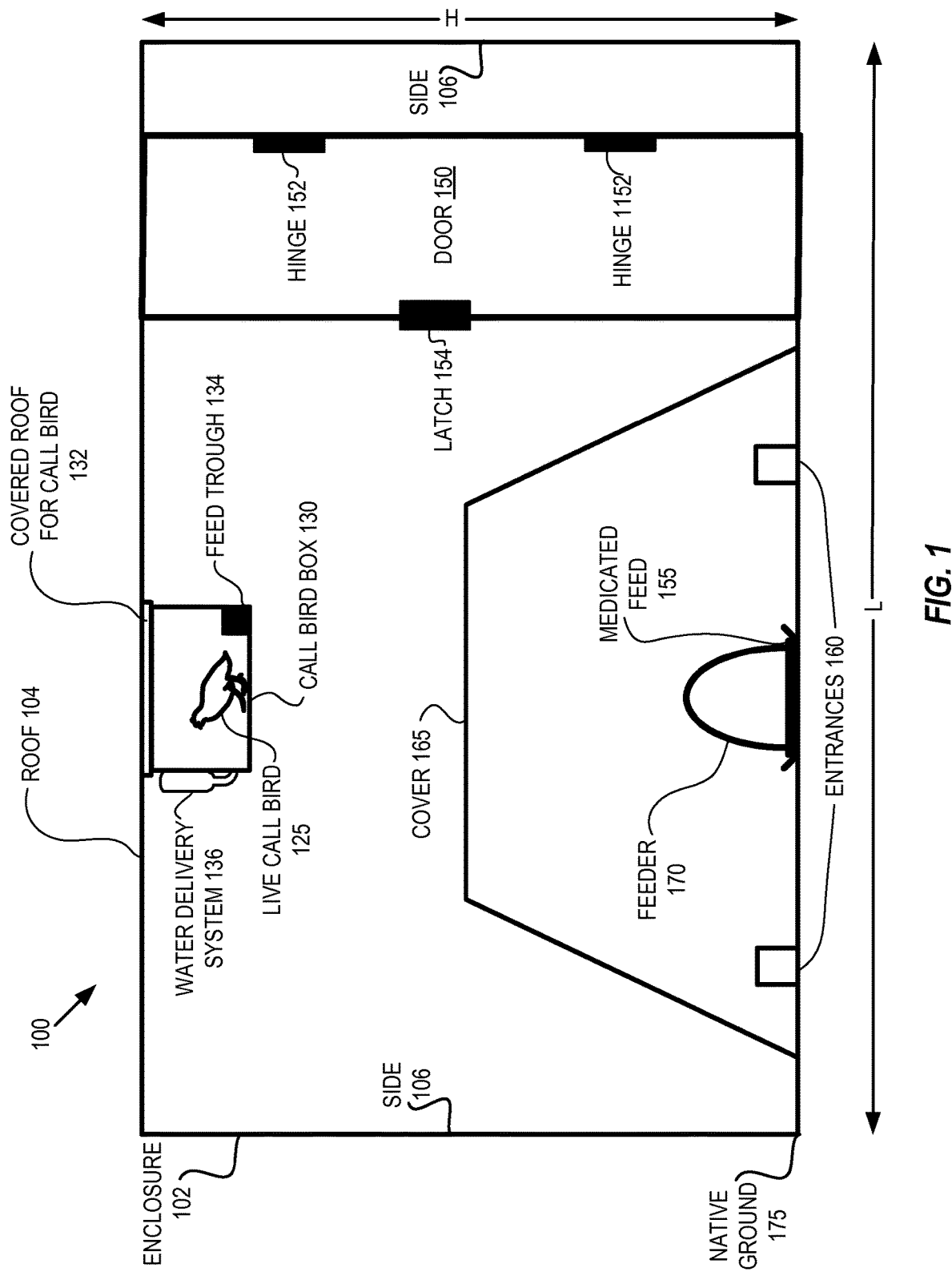
FIG. 1 illustrates a front elevation view of an embodiment of an exemplary system for wild bird treatment.
Figure 2:
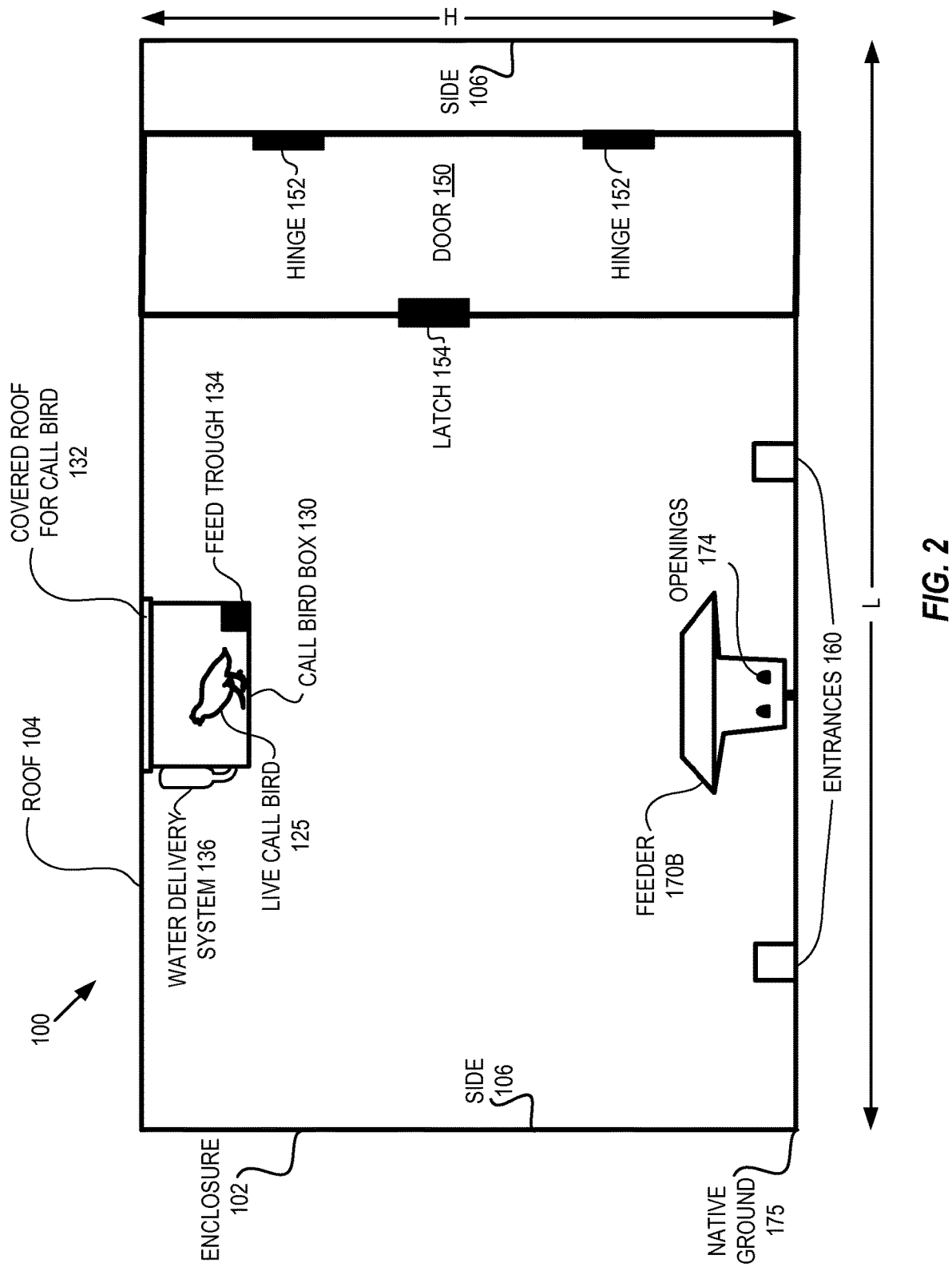
FIG. 2 illustrates a front elevation view of an alternate embodiment of an exemplary system for wild bird treatment.
Figure 3:
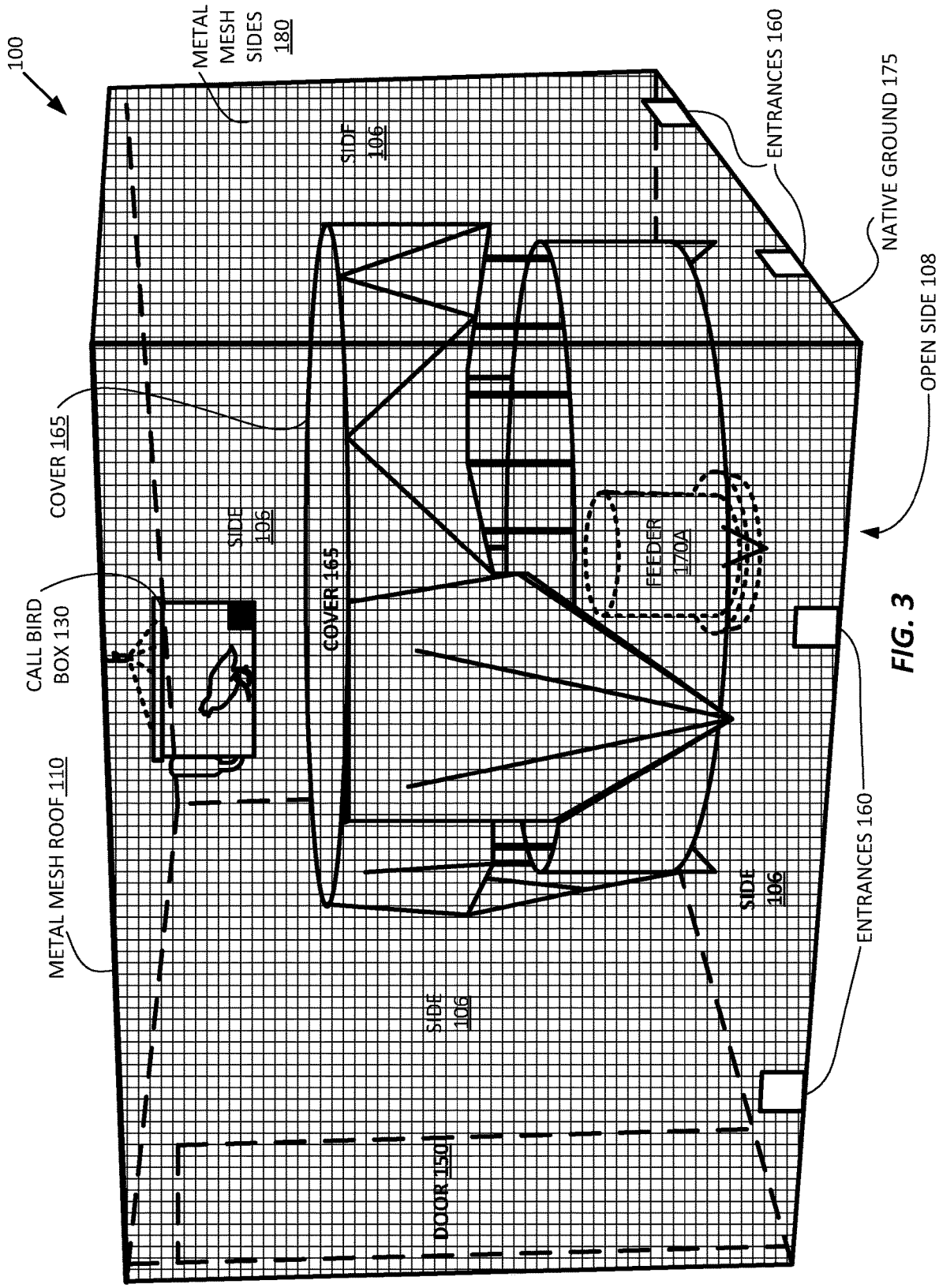
FIG. 3 illustrates an isometric view of an embodiment of an exemplary system for wild bird treatment.

With reference to FIGS. 1, 2, and 3, an exemplary wild bird treatment system 100 is herein described that permits medicated feed to be freely available to a targeted wild species but concurrently inaccessible to non-targeted wild and domesticated animals in the surrounding environment. FIGS. 1 and 2 illustrate a front elevation view and FIG. 3 illustrates an isometric view of an exemplary system 100 for treating wild birds for disease through the use of a medicated feed. System 100 may be used for many years while continuing to treat wild birds, particularly wild coveying birds, such as bobwhite quail for example, for parasitic nematode infections or other diseases.

In an embodiment, wild bird treatment system 100 having an enclosure 102 may be placed on a native ground 175 of the wild bird habitat for delivering a medicated feed 155 to wild, coveying birds. Enclosure 102 of system 100 may be anchored to native ground 175 at the installation site without holes under the base of enclosure 102. Enclosure 102 is large enough that a covey or multiple coveys of wild birds may enter enclosure 102 with adequate available space. In an embodiment for treating bobwhite quail, enclosure 102 of system 100 is large enough to accommodate 25-50 birds.

Referring now to FIG. 3, for wild, coveying birds such as bobwhite quail for example, enclosure 102 may be a generally rectangular structure having a roof 104 and sides 106, which form an open side 108 of enclosure 102 for installing on native ground 175 of the wild bird habitat. For bobwhite quail, enclosure 102 may have, for example, a height of approximately six feet, a width of approximately ten feet, and length of approximately ten feet. It should be noted, however, that other forms, dimensions, and geometries of enclosures may be used, including a hemispherical shaped enclosure. The color of enclosure 102 is such that it blends into the landscape as part of the native habitat. For example, a flat green color is suitable in the Rolling Plains ecoregion of West Texas.

Figure 4:
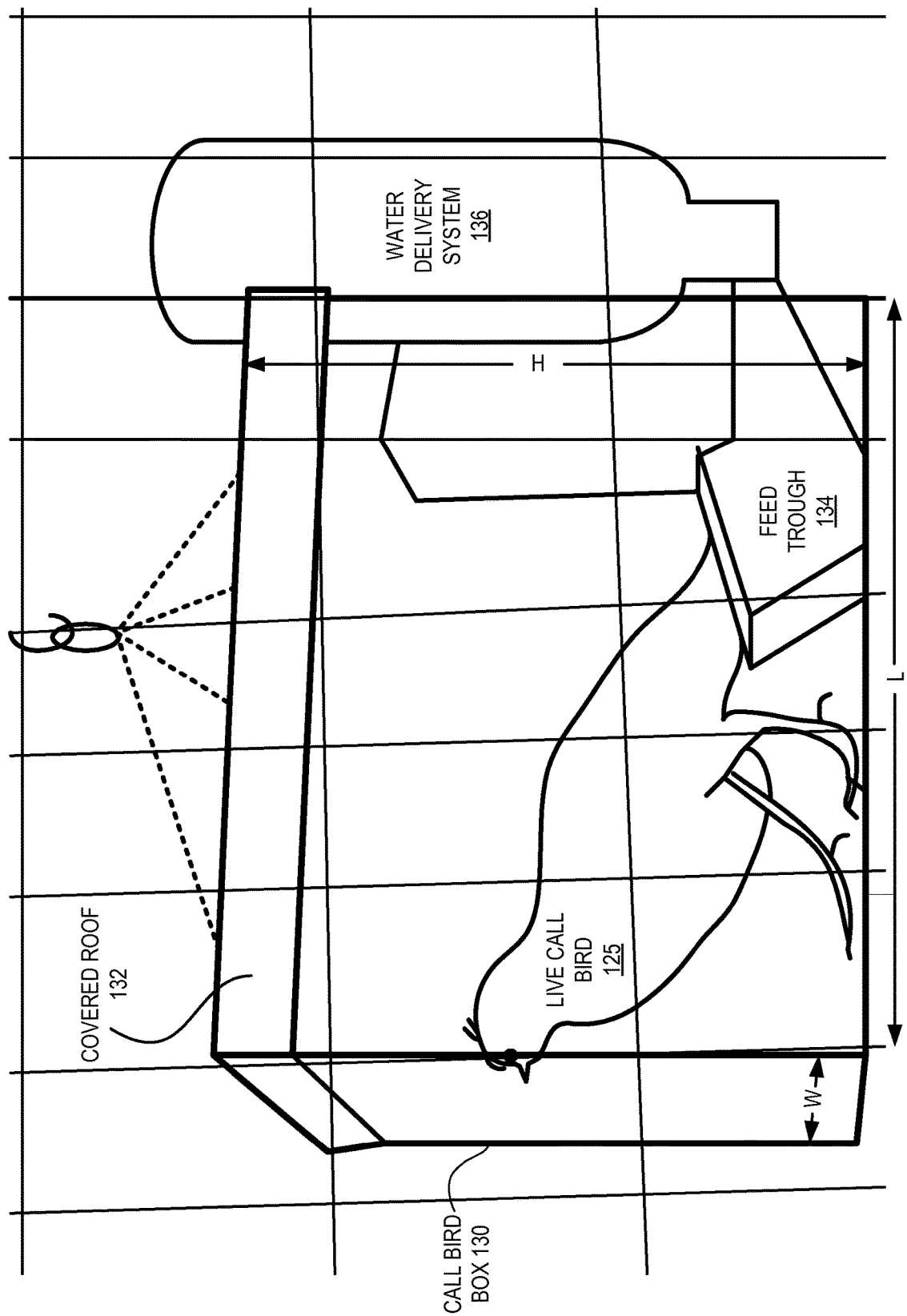
FIG. 4 illustrates an isometric detail view of a call bird box hanging within the enclosure of an exemplary system, according to embodiments of the present invention.

Referring to FIGS. 3 and 4, a conventional metal mesh 110 with openings 112 formed therein covers roof 104 of enclosure 102 of system 100, and a metal mesh 180 with openings 112 formed therein covers sides 106 of enclosure 102. While any suitable material may be used to form enclosure 102, fabricated metal mesh made of 14 gauge expanded metal is suitable to prevent or at least inhibit wild animals from climbing up and onto enclosure 102. Openings 112 in the metal mesh may be sized to prevent non-targeted wild and domesticated animals from entering system 100 to eat or disturb medicated feed 155. In an embodiment for delivery of drug treatment to wild coveying birds such as bobwhite quail, a commercially available metal mesh 180 for sides 106 may have rectangular openings with approximate 3 inch by 1½ inch sides, and a commercially available metal mesh 110 for roof 104 may have rectangular openings with approximate 3 inch by 1½ inch sides. In another embodiment, a commercially available metal mesh 180 for sides 106 may have openings formed by a diamond-shaped quadrilateral, such as a parallelogram or rhombus, with axial dimensions of approximately 2½ inches by 1¼ inches. In an alternate embodiment, commercially available corrugated metal panels may be used for roof 104. One or more bird entrances 160 are formed in metal mesh 180 of sides 106 at approximately ground level to permit a targeted wild bird species to walk in, feed, and then walk out. In an embodiment for treating wild, coveying birds such as bobwhite quail, four entrances 160 (two shown in FIGS. 1, 2, and 3) may be provided in enclosure 102 of system 100, preferably two on a side and two on the opposing side.

System 100 includes a call bird box 130 having a covered roof 132 and a feeder 170 protected from the environment by a cover 165 (if required), all of which are described in more detail below.

FIG. 4 depicts an isometric detail view of an embodiment of a call bird box 130 within enclosure 102 formed by metal mesh 110 and 180. Call bird box 130 is designed and constructed to be a home for a call bird 125 of the same species as the targeted birds to be treated with system 100. Call bird box 130 may be a sub-cage providing live call bird 125 with protection, including covered roof 132. Call bird box 130 includes feed trough 134 and a water bottle delivery system with a drinking cap for call bird water access ("water delivery system") 136, in order to provide a continual supply of food and water to live call bird 125. For a bobwhite quail call bird, call bird box 130 may be approximately ten inches wide by ten inches long by eight inches high. In an embodiment for treating wild coveying birds such as bobwhite quail, the bottom of call bird box 130 may be located approximately five feet from native ground 175 to help the bird calls to carry a greater distance, and call bird box 130 is preferably positioned on the east side of system 100 in order to be shaded from the summer afternoon sun.

Referring to FIGS. 1 and 2, system 100 may also include a door 150 with hinges 152 and latch 154 to provide human access to system 100 for replenishing water to water delivery system 136, food to feed trough 134, and medicated feed 155 to feeder 170.

Once system 100 is installed at a site in the wild bird habitat as described in more detail below, bird calls of live call bird 125 attract targeted, wild coveying birds to system 100. Once the targeted birds are attracted to the vicinity of system 100, they are enticed inside enclosure 102 of system 100 by the sight of, and bird calls from, live call bird 125.

In an embodiment for treating bobwhite quail, live call bird 125 may be an easily obtainable pen-reared bobwhite quail.

Once inside enclosure 102 of system 100, the targeted species readily feeds on medicated feed 155 provided in feeder 170. Feeder 170 provides continual medicated feed 155 to the targeted wild birds. Feeder 170 may be a conventional, commercially available feeder, such as those commonly used for feeding wild game birds. In an embodiment, wild birds habituated to feeding in system 100 can readily be provided medicated feed 155 for parasite or disease control at any time. A prior evaluation of infection levels in the targeted species, for example wild coveying birds such as bobwhite quail, determines when and where to provide medicated feed 155 in systems 100 as will be more fully described hereinafter.

Medicated feed 155 is preferably protected from the environment. The Rolling Plains ecoregion, in particular, is subject to high winds. To treat only a targeted species and protect non-targeted species, medicated feed 155 must be contained and protected from being blown outside treatment system 100. In addition, the efficacy of medicated feed 155 may be dependent on environmental conditions, such that it must be protected from various forms of precipitation, for example.

Figure 6:
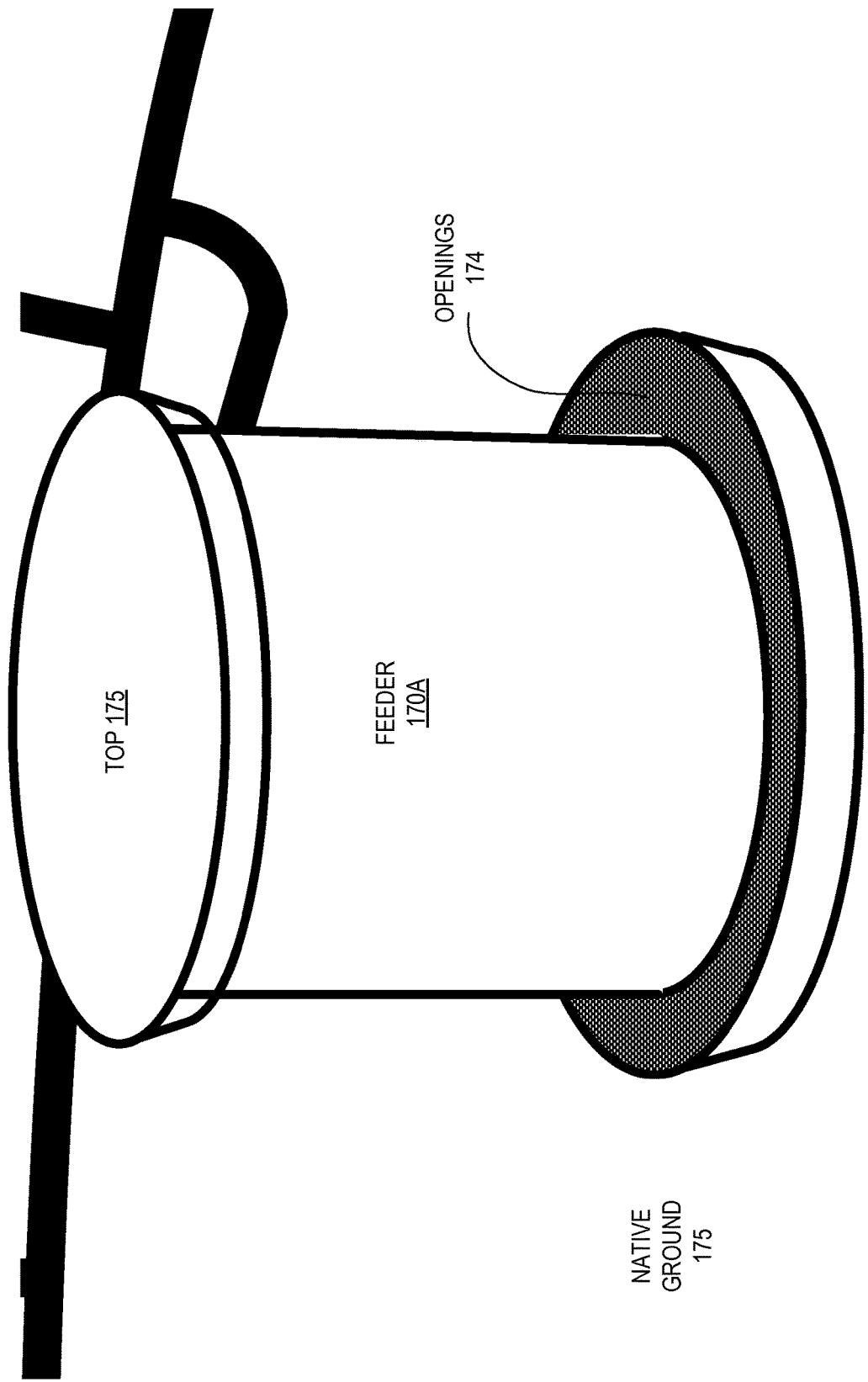
FIG. 6 illustrates a detail view of a wild bird treatment system feeder, according to embodiments of the present invention.
Figure 7:
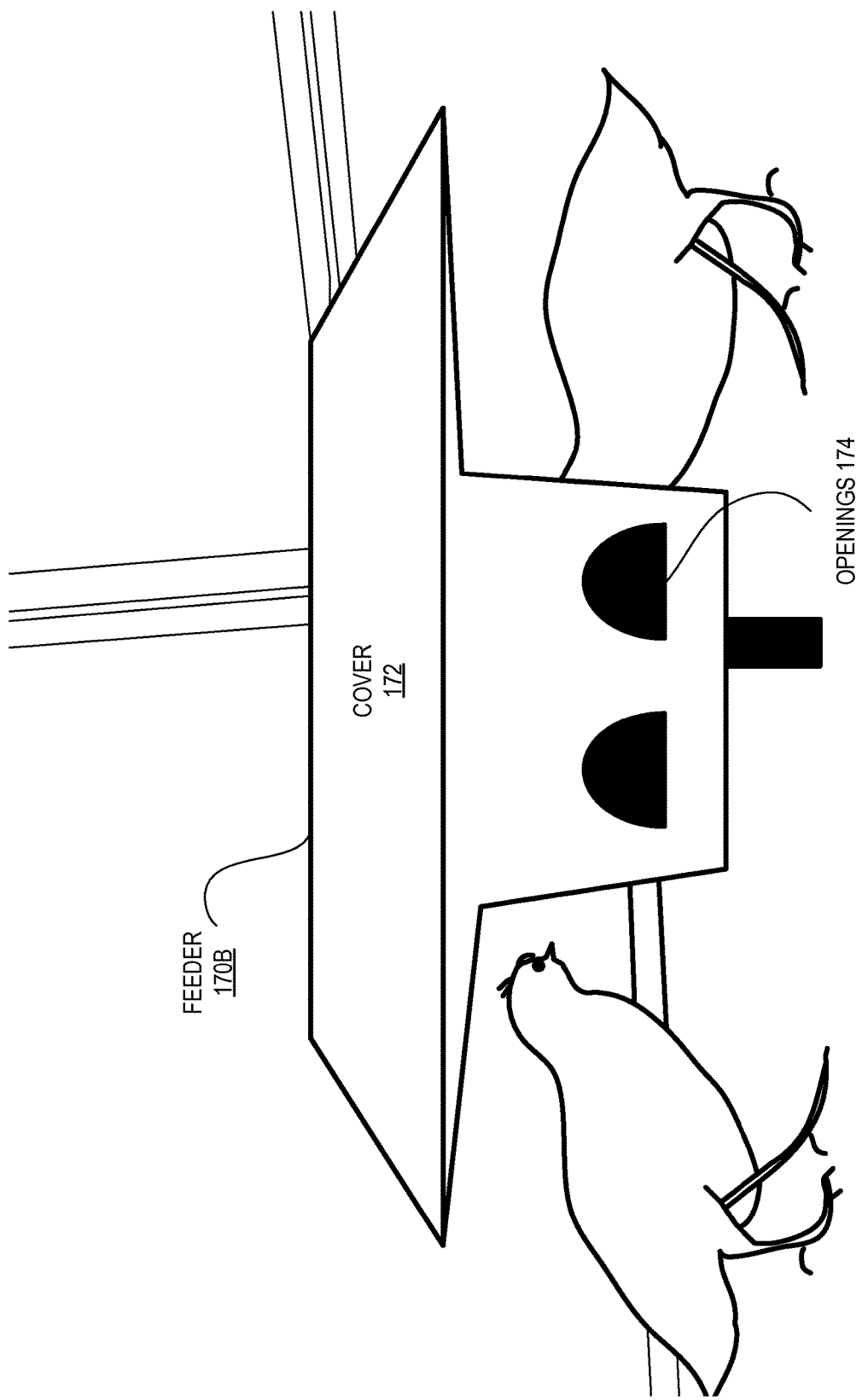
FIG. 7 illustrates a detail view of an alternate wild bird treatment system feeder, according to embodiments of the present invention.

FIGS. 6 and 7 depict detailed views of suitable protected feeders 170A and 170B, respectively, for wild bird treatment system 100. Referring now to FIGS. 3 and 6, feeder 170A is depicted protected by a suitable cover 165 which may be a tarp, for example, such that the medicated feed is not blown outside system 100 by wind or damaged by precipitation, such as rainfall or snow. The feeder includes a container 170A with a removable top 175 for holding the feed. FIGS. 2 and 7 depict a suitable feeder 170B with an integral cover 172 to protect medicated feed 155 from weather and wind. Feeders 170A and 170B have openings 174 formed therein so that the targeted birds can access medicated feed 155. Openings 174 in feeder 170B are sized to permit a quail's head to access the opening yet small enough to prevent the wind from blowing medicated feed 155 outside the feeder. Openings 174 are also preferably elevated above native ground 175 to prevent small animals that may enter enclosure 102 through entrances 160 of enclosure 102 to access medicated feed 155.

Figure 5:
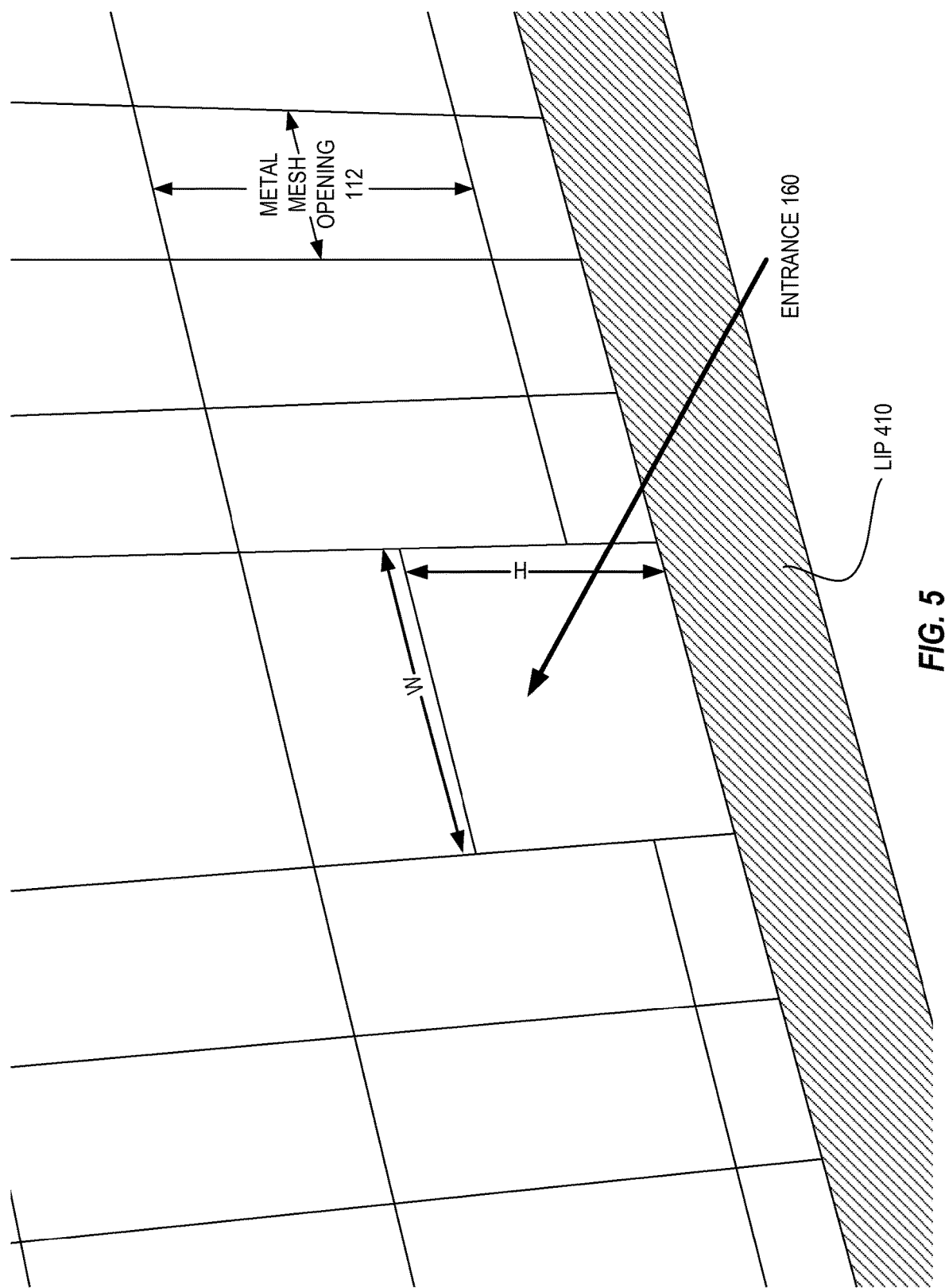
FIG. 5 illustrates a detail view of a bird entrance to an enclosure of an exemplary system for treating wild birds, according to embodiments of the present invention.

Referring now to FIG. 5, details of exemplary entrances 160 of enclosure 102 of system 100 are further illustrated. Metal mesh 180 covers sides of enclosure 102 to system 100 to exclude non-targeted wild and domesticated animals. Ground entrances 160 may be sized to allow the targeted species to walk into enclosure 102 to feed, while excluding other birds and particularly mammalian wildlife, thus administering medicated feed 155 for parasite or disease control to only the targeted species. In an embodiment for treatment of wild coveying birds, such as bobwhite quail, two square entrances 160 are provided in each of two sides of enclosure 102 and for bobwhite quail are sized to be approximately four inches high by four inches wide. In another embodiment for treatment of wild coveying birds such as bobwhite quail, two triangular entrances 160 are provided in each of two sides of enclosure 102 and for bobwhite quail are sized to have a base of approximately four inches and sides of approximately five inches. A protective lip 410 made of metal or other suitable materials may be deployed around enclosure 102 to deter ground predators from digging under enclosure 102 and disturbing medicated feed 155.

Figure 8:
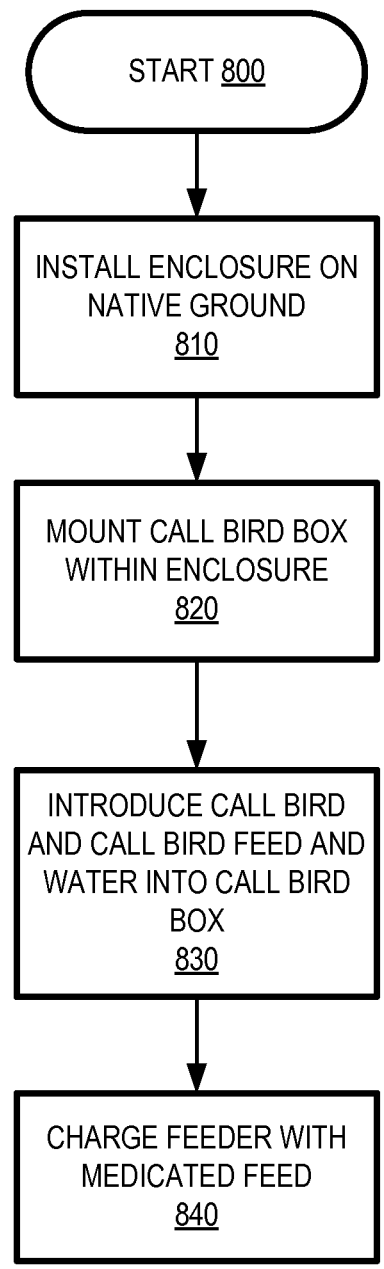
FIG. 8 illustrates a flow chart for a method of installing a wild bird treatment system, according to embodiments of the present invention.

FIG. 8 depicts a process flow diagram of an exemplary method of installing a single treatment system 100 at a specific site in the wildlife habitat. Referring now to FIG. 8, wild bird treatment system installation starts at step 800. In step 810, an enclosure 102 having entrances 160 and door 150 formed therein is initially installed on native ground 175 at a suitable site in the targeted habitat area. The color of enclosure 102 is such that it blends into the landscape of the targeted area of the native habitat. For example, a flat green color is suitable for many targeted areas of native habitat in the Rolling Plains ecoregion of West Texas.

System 100 is preferably installed adjacent to adequate ground habitat to protect the wild, coveying birds from predators and is preferably located to the east of standing vegetation (e.g. salt cedar and mesquite trees), so that shade can be provided for the summer afternoon sun.

In step 820, call bird box 130 is mounted within enclosure 102. The bottom of call bird box 130 may be located approximately five feet from native ground 175 to help the bird calls carry a greater distance. Call bird box 130 may be positioned on the east side of system 100 in order to be shaded from the summer afternoon sun.

In step 830, call bird 125 and its feed and water are introduced into call bird box 130. Due to the reproduction cycle of wild coveying birds such as bobwhite quail, the call of the call bird may be made more attractive by changing the gender of the call bird depending on the season of the year. Call bird 125 is preferably a rooster when system 100 is deployed in the winter, spring, or fall. Call bird 125 is preferably a hen when system 100 is deployed in the summer Rooster feed may be a commercially available feed designed for mature, healthy poultry. Hen feed is preferably a commercially available feed designed for mature egg-laying poultry with the addition of oyster shell crumbles to assist the hen in maintaining adequate calcium levels during the egg laying period. A water-borne antibiotic is preferably administered to call bird 125 by adding it to the call bird's drinking water for the first week when system 100 is put in service.

In step 840, feeder 170 is charged with medicated feed 155; however water is not typically provided for the targeted birds. Medicated feed 155 may be a formulated chicken mash diet with integrated treatment drug. For treatment of bobwhite quail, milo may be used to pre-bait system 100. Once wild bobwhite quail begin utilizing system 100, medicated feed 155 may be integrated with the milo to introduce the birds to the new feed. For example, bobwhite quail may be transferred from a 100% milo diet to a 100% medicated feed 155 diet in about one week.

Figure 9:
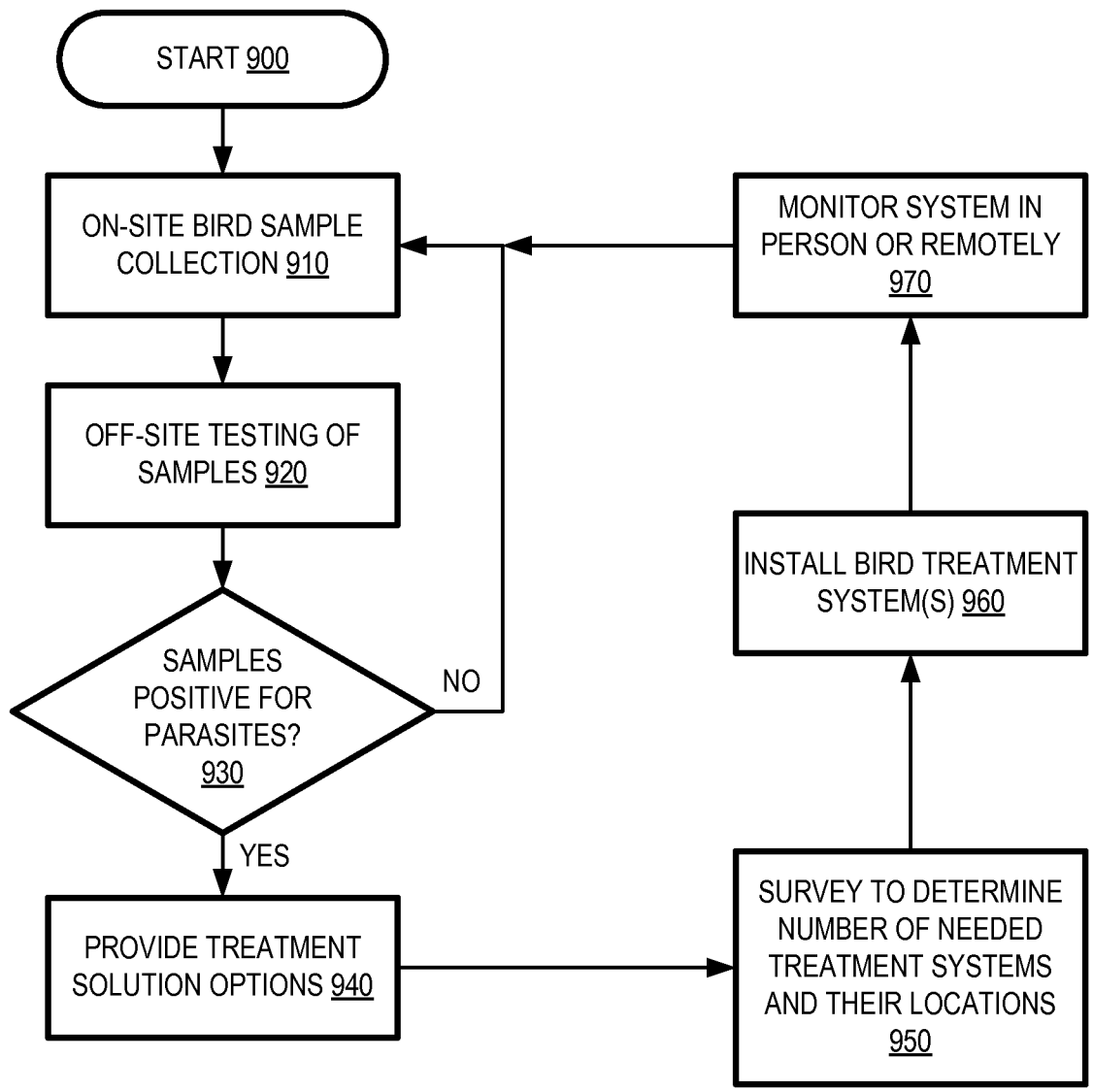
FIG. 9 illustrates a flow chart for a method of treating wild birds, according to embodiments of the present invention.
Figure 10:
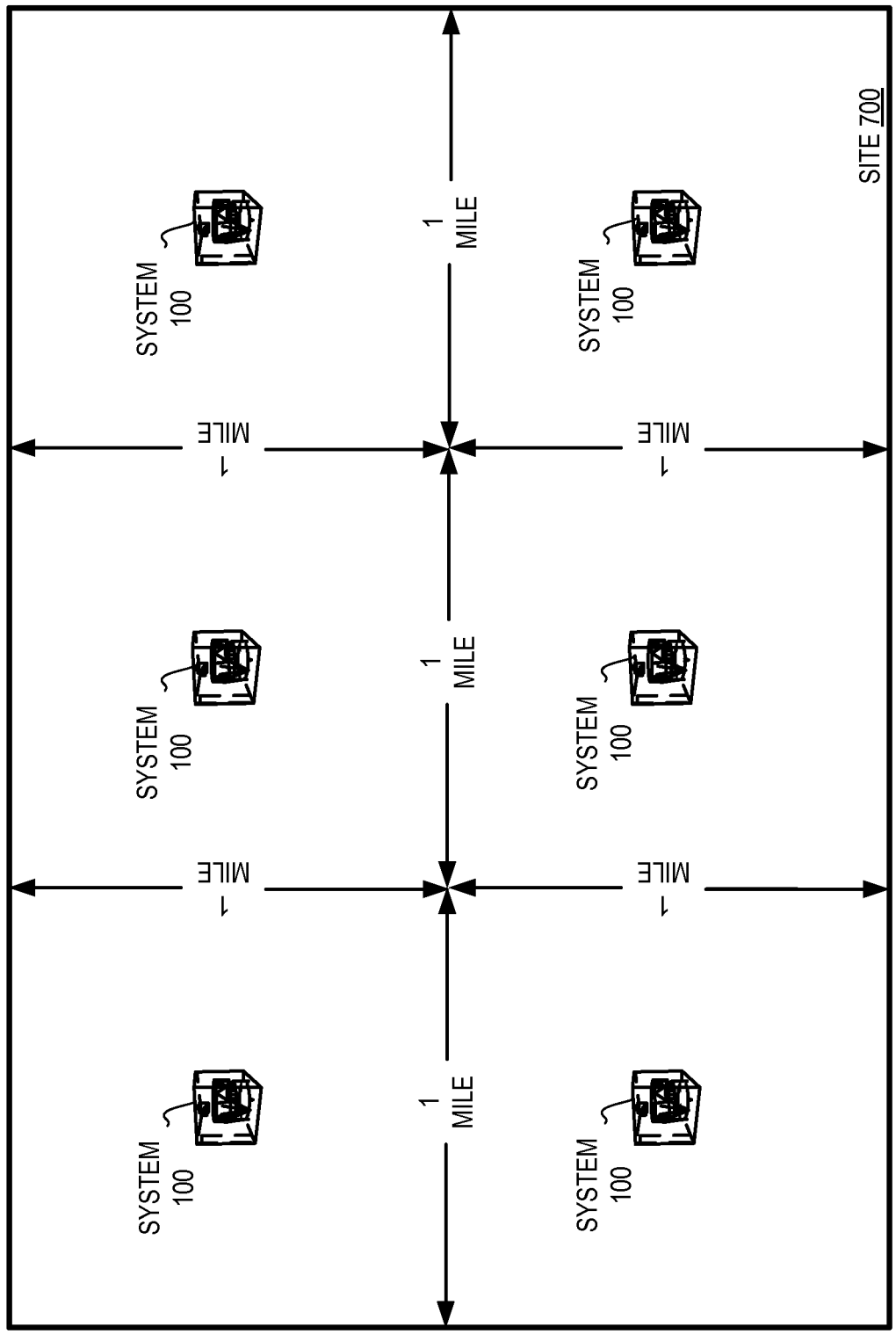
FIG. 10 illustrates an exemplary installation site view of an array of wild bird treatment systems located in a targeted area of the wild bird habitat, according to embodiments of the present invention.

FIG. 9 depicts a process flow diagram of an exemplary method of treating wild birds in a targeted geographical area of the wildlife habitat. FIG. 10 illustrates an installation site plan 700 for installing a plurality of bird treatment systems 100 at various sites throughout the targeted area which are suitable for use in carrying out the method depicted in FIG. 9.

Referring now to FIGS. 9 and 10, the wild bird treatment method starts at step 900. At step 910, samples from wild, coveying birds are collected from site 700. At step 920, the collected samples are tested to determine if the targeted wild, coveying birds are infected with parasites or another disease being investigated. At step 930, if testing shows that there are parasites or other diseases, treatment solution options are formulated at step 940. If no parasites or diseases are found in the collected samples, the method returns to step 910, involving sampling of the targeted wild, coveying birds at a later time.

At step 950 the number of needed treatment systems 100 and locations on site 700 are determined by conducting a survey of site 700. Factors included in determining how many and where system(s) 100 are placed include the targeted species, terrain topology, prevailing wind directions, and ambient noise level. Generally, one treatment system per section of land (or per square mile) should be adequate. Camera surveillance in the treatment system can provide detailed information on bird use in terms of numbers, time, and frequency of visits, if desired.

As depicted in FIG. 9, for treating wild, coveying birds such as bobwhite quail, wild bird treatment systems 100 are preferably installed at a rate of about one system per square mile of habitat in which the treatment of the targeted bird is to be applied in relatively quiet rural areas having relatively level terrain. Treatment systems 100 should be located approximately in the center of the section to be treated, so that the call of live call bird 125 will be able to reach out at least one half mile in a 360° radius to attract other wild birds of the same species to systems 100. The locations of and placement of such systems may vary in other environments, depending on the terrain, background noise level, and other factors.

At step 960 wild bird treatment system(s) 100 are installed. System 100 is preferably installed adjacent to adequate ground habitat to protect the wild coveying birds from predators and is preferably located to the east of standing vegetation (e.g. salt cedar and mesquite trees), so that shade can be provided for the summer afternoon sun. In an embodiment for treating bobwhite quail, systems 100 are preferably deployed in late winter or early spring to facilitate habituation of the wild coveying birds to come to the treatment system 100 for feeding so that medicated feed can be delivered easily to the targeted birds at a later time.

Installation 960 includes introduction of call bird 125 to system 100. Due to the reproduction cycle of wild coveying birds, in an embodiment of the present invention for treating coveying birds such as bobwhite quail, call bird 125 is preferably a rooster when system 100 is deployed in the winter, spring, or fall. Call bird 125 is preferably a hen when system 100 is deployed in the summer of the year. Installation 960 of system 100 also includes providing call bird 125 with food and water. In an embodiment for treating bobwhite quail, preferred rooster feed is a commercially available feed designed for mature, healthy poultry. Preferred bobwhite quail hen feed is a commercially available feed designed for mature egg-laying poultry with the addition of oyster shell crumbles to assist the bobwhite quail hen in maintaining adequate calcium levels during the egg laying period. A water-borne antibiotic is preferably administered to call bird 125 for one week at installation step 960 when system 100 is put in service.

In an embodiment for treating wild coveying birds, installation 960 may include charging feeder 170 with medicated feed 155 but does not include providing water. Medicated feed 155 may be a formulated mash diet with integrated treatment drug. For treatment of wild coveying birds such as bobwhite quail, milo may be used to pre-bait system 100. Once wild bobwhite quail begin utilizing system 100, medicated feed 155 may be integrated with the milo to introduce the birds to the new feed. Bobwhite quail may be transferred from a 100% milo diet to a 100% medicated feed 155 diet in about one week.

At step 970, wild bird treatment system(s) 100 are monitored in person or remotely via cameras or other electronic means having the capability to transmit the pictures to a central observation office. For treating wild coveying birds such as bobwhite quail, step 970 includes weekly on-site monitoring and re-stocking of live call bird 125 feed and water.

The method returns to step 910, sampling of wild, coveying birds to determine if the parasites are controlled in the targeted bird species. The sampling of birds after medicated feed treatment can occur promptly after the treatment period (estimated 2 weeks to 1 month) is concluded.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

As used herein, the terms "or" is intended to cover a non-exclusive inclusion. That is, "or" includes both meanings of both "or" and "and/or."

The terminology used herein is for the purpose of describing particular embodiments only and is not intended to be limiting of the invention. As used herein, the singular forms "a", "an" and "the" are intended to include the plural forms as well, unless the context clearly indicates otherwise.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and are not intended to otherwise limit the scope of the present invention in any way. Other variations are within the scope of the following claims. Those skilled in the art having read this disclosure will recognize that changes and modifications may be made to the embodiments without departing from the scope of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations.

The flowchart and block diagrams in the drawings illustrate the architecture, functionality, and operation of possible implementations of systems and methods, according to various embodiments of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

What is claimed is:

1. A system for treating wild birds, comprising:
an enclosure suitably sized to accommodate a plurality of wild coveying birds targeted for treatment, the enclosure having a roof portion, an open bottom for facing native ground upon installation, a side portion between the roof portion and the open bottom having an edge adjacent to the open bottom, and a protective lip portion attached to the edge of the side portion and extending outwardly from the edge of the side portion wherein the side portion of the enclosure is formed of a mesh material having openings therein sized to prevent non-targeted animals from climbing up or onto the enclosure or entering though the openings in the mesh material and the protective lip portion is configured to deter ground predators from digging under the side portion of the enclosure upon installation;
a call bird box supported within the enclosure above the open bottom and configured for housing a call bird of the same species as the targeted wild coveying birds that makes calls to attract the plurality of targeted wild coveying birds, wherein the call bird box includes a call bird feed trough;
at least one entrance into the enclosure adjacent the open bottom that is sized and located to permit the targeted wild coveying birds to freely enter into and exit from the enclosure while excluding non-targeted animals;
a medicated feed feeder within, and in proximity to the open bottom of, the enclosure for containing medicated feed for feeding the targeted wild conveying birds entering the enclosure in order to treat the targeted wild coveying birds for parasites or disease, wherein the medicated feed feeder comprises a container for holding the medicated feed, the container having a plurality of openings formed therein at a location elevated above the native ground such that the wild coveying birds can continually access the medicated feed while inhibiting small animals from accessing the medicated feed; and
a protective cover for protecting the medicated feed in the medicated feed feeder from the environment.

2. The system of claim 1, wherein the enclosure is colored to blend into a habitat area of the targeted wild coveying birds.

3. The system of claim 1, wherein the enclosure comprises a door suitably sized to accommodate an adult person of average size.

4. The system of claim 1, wherein the enclosure size is approximately 10 feet long by 10 feet wide by 6 feet high.

5. The system of claim 1, wherein the mesh material has openings formed by a diamond-shaped quadrilateral having axial dimensions of approximately 2½ inches by 1¼ inches.

6. The system of claim 1, wherein the roof portion is formed of the mesh material and the mesh material comprises fabricated expanded metal mesh.

7. The system of claim 1, wherein the call bird box is positioned approximately five feet above the native ground for improving the transmission of the calls from the call bird into the habitat area of the targeted wild coveying birds.

8. The system of claim 1, wherein the call bird box is secured to the top of the enclosure.

9. The system of claim 1, wherein the call bird box is a cage with a covered top for protecting the call bird from the environment.

10. The system of claim 9, wherein the call bird box is sized approximately ten inches wide by ten inches deep by eight inches high.

11. The system of claim 1, wherein the call bird box comprises a water delivery system.

12. The system of claim 1, wherein the at least one entrance into the enclosure is sized approximately four inches high by four inches wide.

13. The system of claim 1, wherein the at least one entrance adjacent the open bottom comprises four entrances.

14. The system of claim 1, wherein the cover is not integral to the medicated feed feeder.

15. The system of claim 1, wherein the cover is integral to the medicated feed feeder.

16. A method for installing a system for treating wild coveying birds targeted for treatment wherein:
the system has an enclosure suitably sized to accommodate a plurality of wild coveying birds targeted for treatment, the enclosure having a roof portion, an open bottom, a side portion between the roof portion and the open bottom having an edge adjacent to the open bottom, and a protective lip portion attached to the edge of the side portion and extending outwardly from the edge of the side portion, wherein the side portion of the enclosure is formed of a mesh material having openings therein and has at least one entrance into the side portion of the enclosure adjacent the open bottom that is sized and located to permit the targeted wild coveying birds to freely enter into and exit from the enclosure while excluding non-targeted animals from entering the enclosure; and
the method comprises:
installing the enclosure having the at least one entrance for the wild coveying birds on native ground at a site in the habitat area of the targeted wild coveying birds such that the open bottom faces the native ground, the at least one entrance into the enclosure is adjacent the native ground, and the protective lip portion extends adjacent the native ground outwardly from the side portion of the enclosure to deter ground predators from digging under the side portion;
anchoring the installed enclosure to the native ground;
mounting a call bird box having a feed trough and a water delivery system above the native ground at a determined height within the enclosure, wherein the height is determined by predetermined criteria, including the approximate intended distance into the habitat area the call of the call bird is to be heard by the wild coveying birds targeted for treatment;
introducing a call bird of the same species as the targeted wild coveying birds into the call bird box;
installing a medicated feed feeder within the enclosure in proximity to the open bottom of the enclosure, accessible by the targeted wild coveying birds entering the enclosure through the at least one entrance adjacent the native ground, wherein the medicated feed feeder comprises a container for holding the medicated feed, the container having a plurality of openings formed therein at a location elevated above the native ground such that the wild coveying birds can continually access the medicated feed;
charging the medicated feed feeder with medicated feed suitable for the targeted wild coveying birds which enter the enclosure in order to treat the targeted wild conveying birds for parasites or disease; and installing a protective cover for protecting the medicated feed in the medicated feed feeder from the environment, wherein the protective cover has a top portion made of an opaque precipitation-protective material.

17. The method of claim 16, wherein the call bird box is a cage with a covered top.

18. The method of claim 16, wherein the call bird box is positioned on the east side of the enclosure.

19. The method of claim 16, wherein the call bird is a rooster call bird.

20. The method of claim 16, wherein the call bird is a hen call bird.

21. The method of claim 16, wherein the medicated feed feeder comprises a removable cover for protecting the feed from the environment.

22. The method of claim 16, wherein the feed in the medicated feed feeder is formulated for the targeted wild coveying birds.

23. The method of claim 22, wherein the feed in the medicated feed feeder is a medicated feed formulated for treating the targeted wild coveying birds for parasites.

24. The method of claim 22, wherein the feed in the medicated feed feeder is a medicated feed formulated for treating the targeted wild coveying birds for disease.

25. A method for treating wild coveying birds, comprising:

collecting at least one sample from at least one wild coveying bird targeted for treatment from a targeted area of a natural habitat having a plurality of targeted wild coveying birds;

testing the at least one collected sample to determine if the at least one targeted wild coveying bird is infected with parasites or another disease;

determining the number of and location of treatment systems to be installed at a plurality of sites in the targeted area that are needed to treat the plurality of targeted wild coveying birds in the targeted area;

installing a plurality of treatment systems at the plurality of sites based upon the determining, wherein each of the treatment systems comprises;

an enclosure suitably sized to accommodate the plurality of targeted wild coveying birds, the enclosure having a roof portion, an open bottom for facing native ground upon installation, a side portion between the roof portion and the open bottom having an edge adjacent to the open bottom, a protective lip portion attached to the edge of the side portion and extending outwardly from the edge of the side portion, and at least one entrance for the targeted wild coveying birds to freely enter into and exit from the enclosure, wherein the side portion of the enclosure is formed of a mesh material having openings therein sized to prevent non-targeted animals from climbing up or onto the enclosure or entering though the openings in the mesh material, and wherein the protective lip portion is configured to deter ground predators from digging under the side portion of the enclosure upon installation, a call bird box positioned above native ground within the enclosure for housing a call bird of the same species as the targeted wild coveying birds that makes calls for attracting the plurality of targeted wild coveying birds to enter the enclosure through the at least one entrance, wherein the call bird box includes a feed trough and a water delivery system for providing a continual supply of food and water to the call bird; and a medicated feed feeder located within, and in proximity to the open bottom of, the enclosure for containing medicated feed suitable for the targeted wild coveying birds, wherein the medicated feed feeder comprises a container for holding the medicated feed, the container having a plurality of openings formed therein at a location elevated above the native ground; and charging the medicated feed feeder with medicated feed to treat the targeted wild coveying birds entering the enclosure for parasites or disease.

26. The method of claim 25, wherein each of the plurality of treatment systems are installed adjacent to native ground.

27. The method of claim 25, wherein each of the plurality of treatment systems are oriented to the east of standing vegetation in the natural habitat.

28. The method of claim 25, wherein the call bird box comprises a water delivery system containing a water-borne antibiotic during the first week of service.

29. The method of claim 25, wherein the call bird is a bobwhite quail.

30. The method of claim 25, wherein the plurality of treatment systems are deployed approximately from the fall through spring.

31. The method of claim 30, wherein the call bird is a rooster.

32. The method of claim 31, wherein the medicated feed is formulated for the rooster.

33. The method of claim 25, wherein the plurality of treatment systems are deployed approximately summer.

34. The method of claim 33, wherein the call bird is a hen.

35. The method of claim 34, wherein the medicated feed is formulated for the hen.

* * * * *